R. J. SWEET.
ASPHALT CUTTER.
APPLICATION FILED DEC. 6, 1919. RENEWED SEPT. 19, 1921.

1,413,630.

Patented Apr. 25, 1922.
8 SHEETS—SHEET 1.

Inventor
Roger J. Sweet
by Geyer & Popp
Attorneys

R. J. SWEET.
ASPHALT CUTTER.
APPLICATION FILED DEC. 6, 1919. RENEWED SEPT. 19, 1921.
1,413,630.
Patented Apr. 25, 1922.
8 SHEETS—SHEET 2.
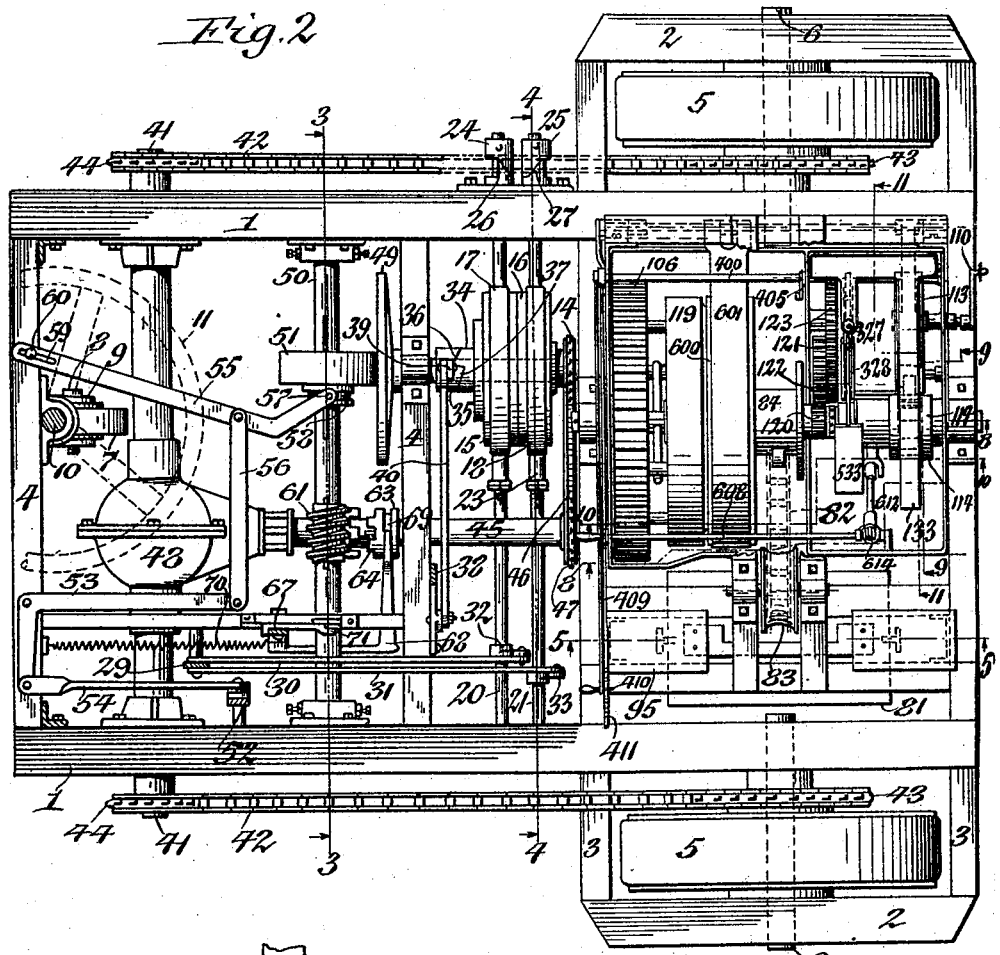
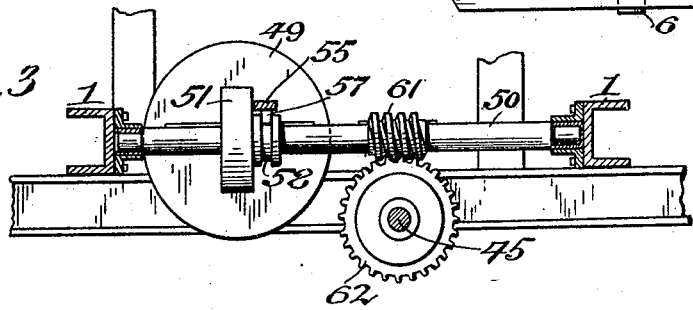

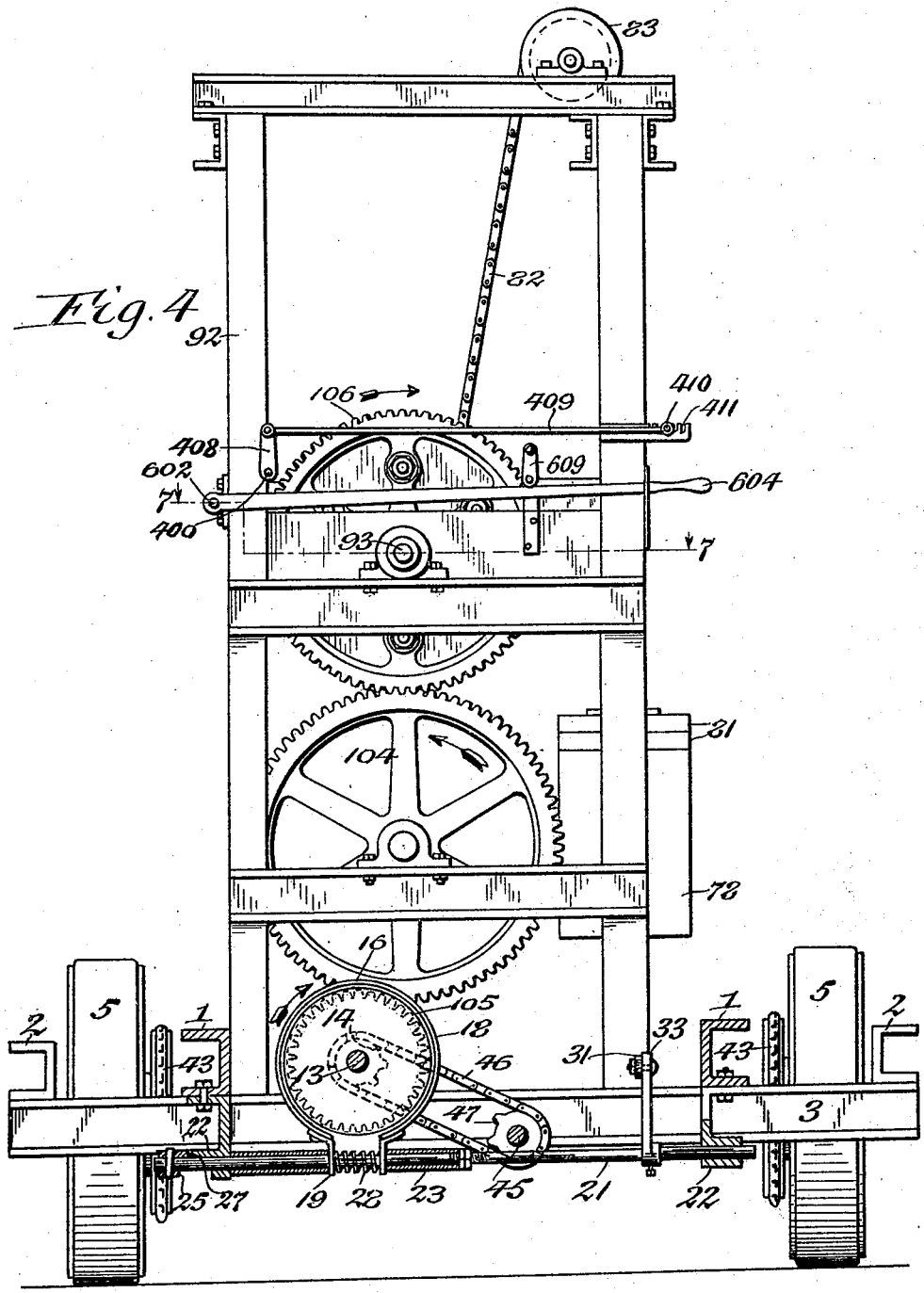

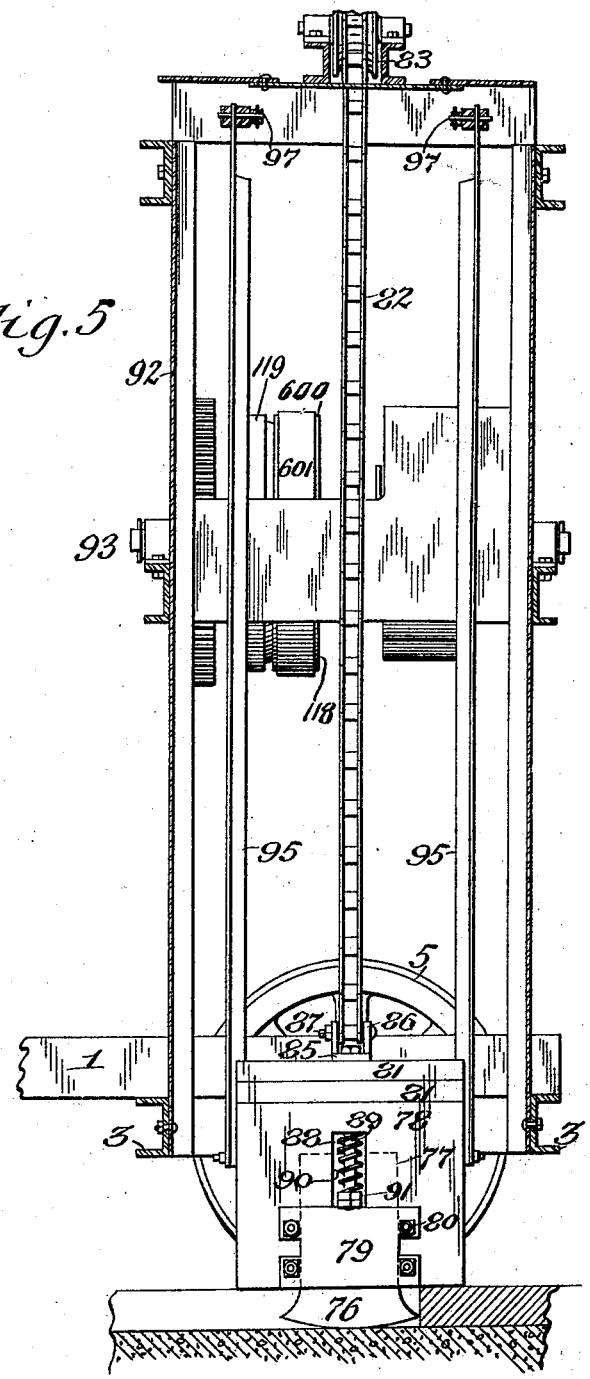

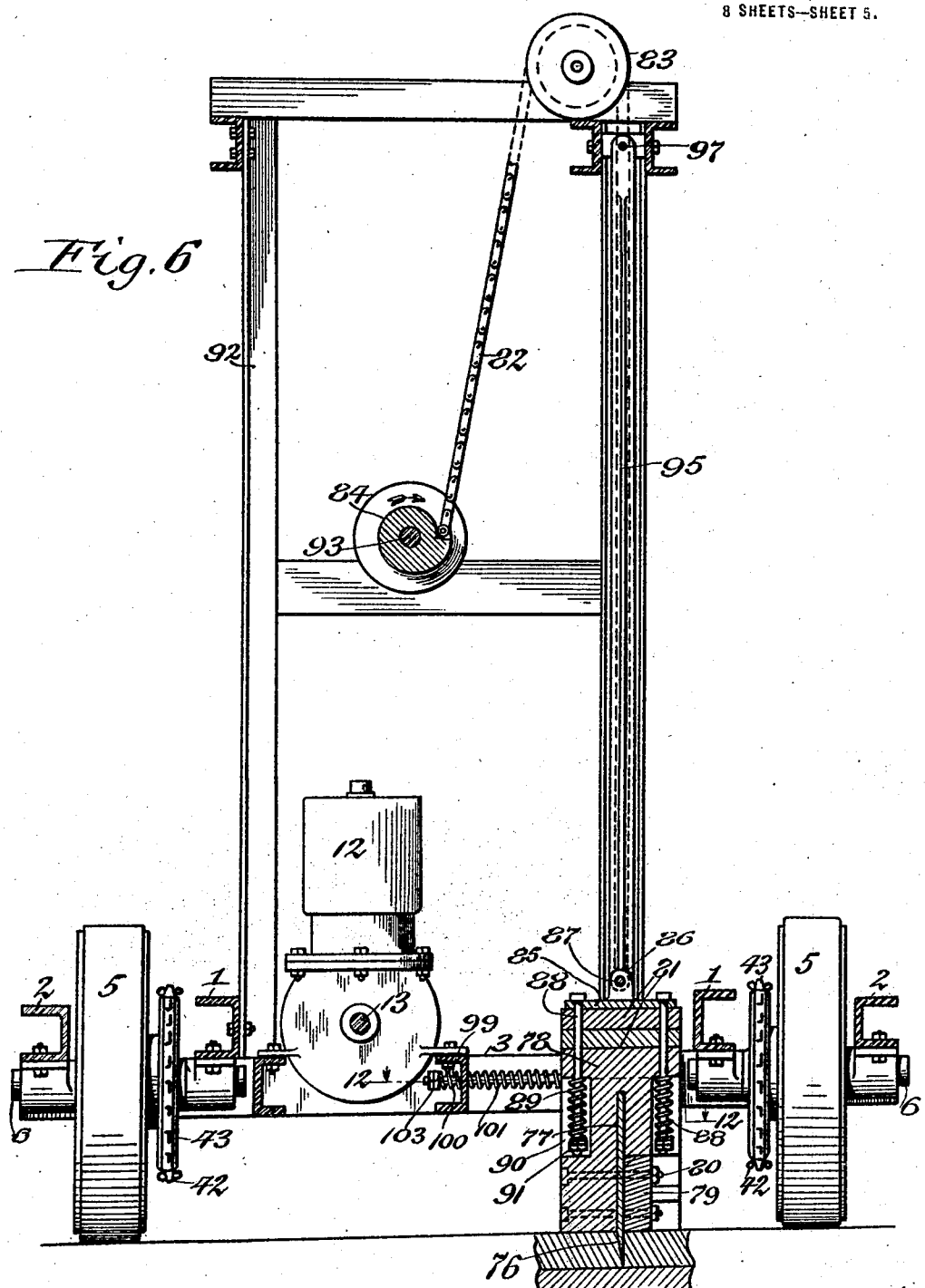

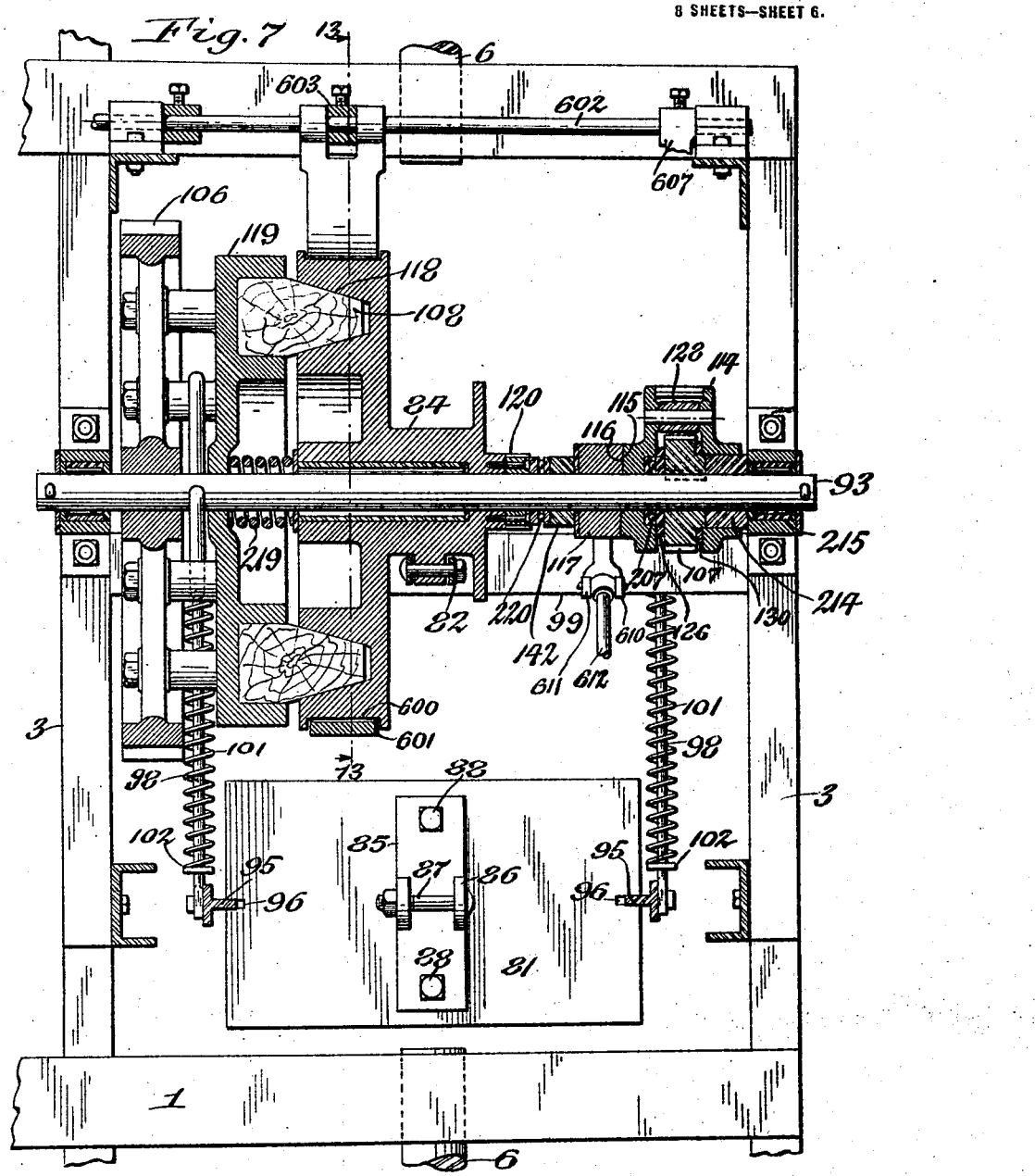

R. J. SWEET.
ASPHALT CUTTER.
APPLICATION FILED DEC. 6, 1919. RENEWED SEPT. 19, 1921.

1,413,630.

Patented Apr. 25, 1922.
8 SHEETS—SHEET 7.

Inventor
Roger J. Sweet
by
Attorneys

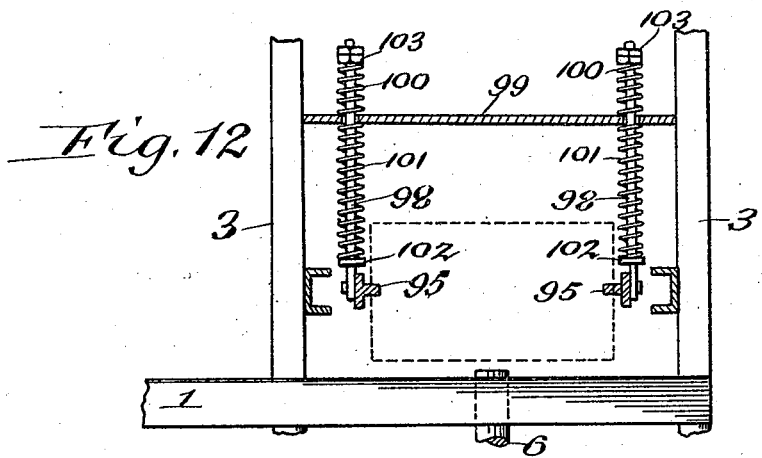
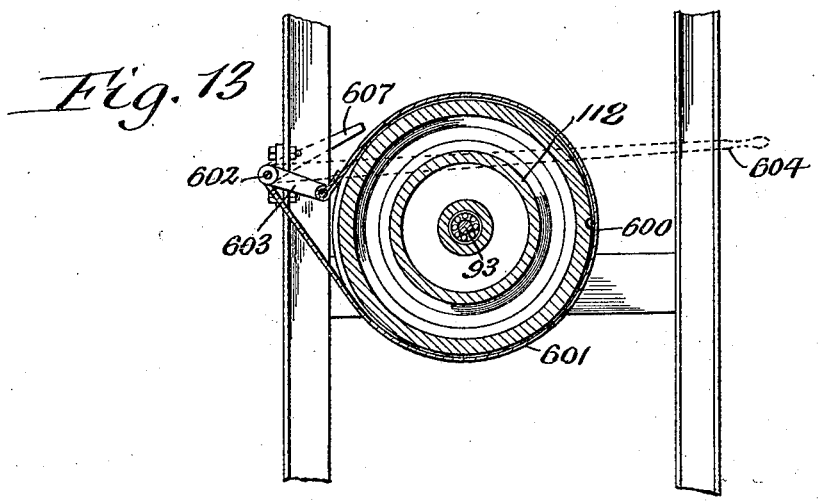

UNITED STATES PATENT OFFICE.

ROGER J. SWEET, OF BUFFALO, NEW YORK, ASSIGNOR, BY MESNE ASSIGNMENTS, TO BUFFALO EQUIPMENT & CONSTRUCTION COMPANY, INC., A CORPORATION OF NEW YORK.

ASPHALT CUTTER.

1,413,630.      Specification of Letters Patent.     Patented Apr. 25, 1922.

Application filed December 6, 1919, Serial No. 342,895. Renewed September 19, 1921. Serial No. 501,828.

*To all whom it may concern:*

Be it known that I, ROGER J. SWEET, a citizen of the United States, resident of Buffalo, in the county of Erie and State of New York, have invented new and useful Improvements in Asphalt Cutters, of which the following is a specification.

This invention relates to a machine for cutting pavements of asphalt or other material and has for its object the production of a machine for this purpose whereby the operation of the cutting tool is positively controlled and permits of varying the stroke of the cutter with ease and facility to suit the blow of the hammer operated cutter to the character of the work in hand.

Figure 1:
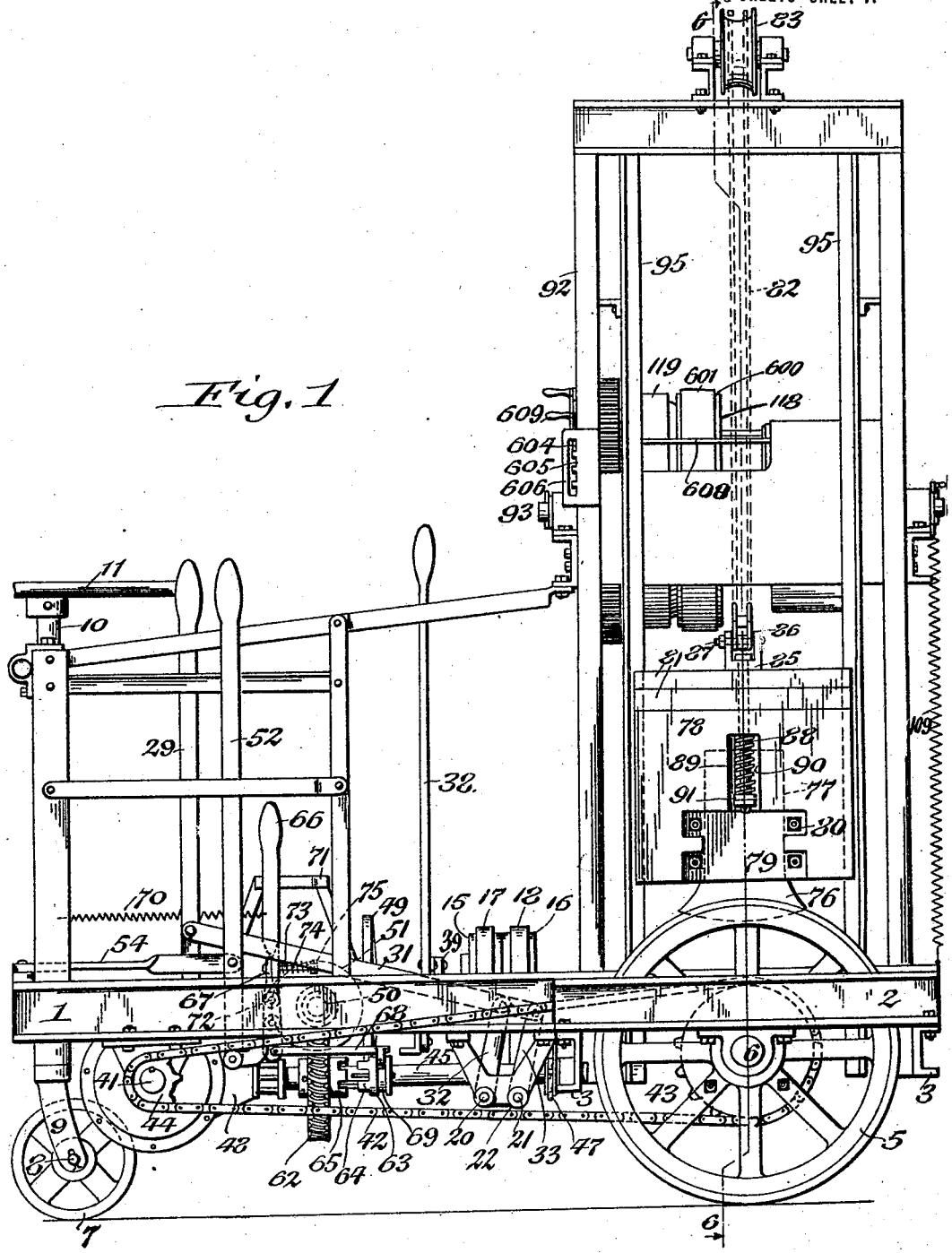
Figure 8:
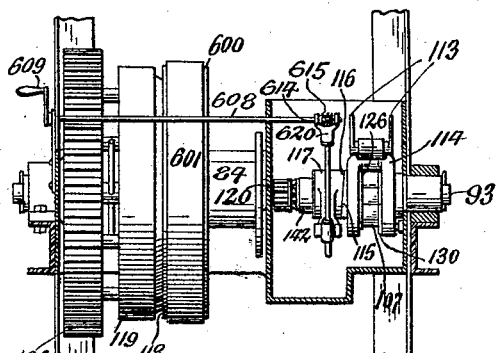
Figure 9:
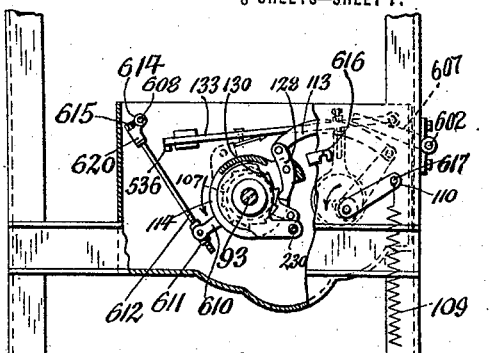
Figure 10:
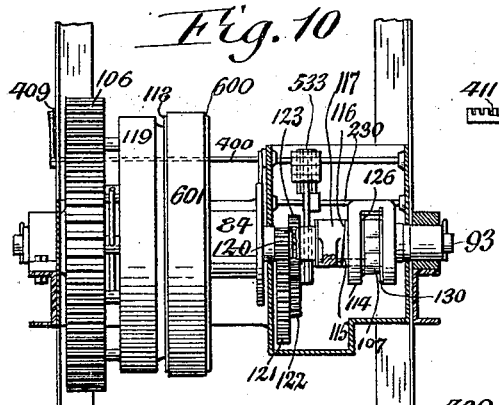
Figure 11:
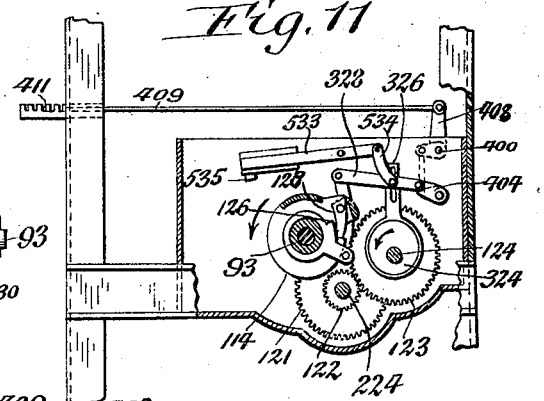
Figure 14:
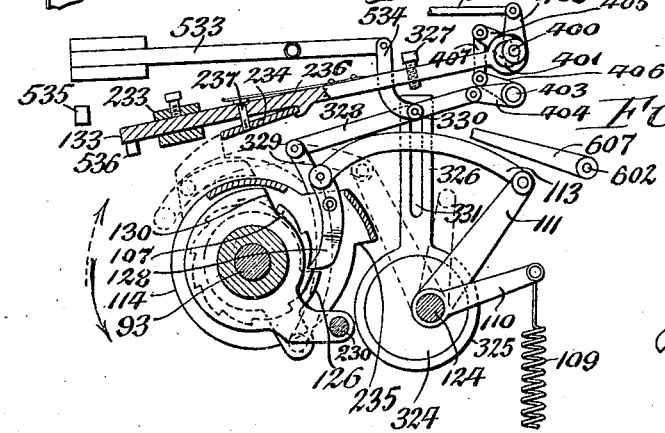

In the accompanying drawings:

Figure 1 is a side elevation of an asphalt cutter embodying one form of my invention. Figure 2 is a top plan view of the same, showing some of the parts in section. Figure 3 is a fragmentary vertical cross section taken on line 3—3, Fig. 2. Figure 4 is a vertical cross section taken on the correspondingly-numbered line in Fig. 2. Figure 5 is a fragmentary vertical longitudinal section taken on line 5—5, Fig. 2. Figure 6 is a vertical cross section taken on line 6—6, Fig. 1. Figure 7 is a horizontal section, on an enlarged scale, taken on line 7—7, Fig. 4. Figure 8 is a fragmentary longitudinal section on line 8—8, Fig. 2. Figure 9 is a vertical transverse section on line 9—9, Fig. 2. Figure 10 is a vertical longitudinal section on line 10—10, Fig. 2. Figure 11 is a vertical transverse section on line 11—11, Fig. 2. Figure 12 is a fragmentary horizontal section on line 12—12, Fig. 6. Figure 13 is a fragmentary vertical section on line 13—13, Fig. 7. Figure 14 is a fragmentary cross section, on an enlarged scale, similar to Figs. 9 and 11, and showing the working parts in a different position.

Similar characters of reference refer to like parts throughout the several views.

The main frame of the carriage which supports the working parts preferably comprises two inner long sills 1, 1, two outer short auxiliary sills 2, 2, two long transverse sills 3, 3, connecting the front parts of the long inner sills with the opposite ends of the short sills, and a plurality of short transverse sills 4, 4, connecting the main sills. The rolling support for this frame preferably comprises two front traction wheels 5, 5, each of which is arranged between the front part of one of the long sills 1 and the adjacent short sill 2 and is mounted upon a horizontal axle 6 which is journaled transversely in bearings on the adjacent parts of the respective main and auxiliary sills, as best shown in Figs. 1, 2 and 6. Underneath the rear part of the main frame is arranged a steering wheel 7 which has its horizontal axle 8 journaled in bearings at the lower end of a fork 9 which latter is secured to an upright steering post 10. The latter is journaled on the adjacent part of the main frame and provided with a hand wheel 11 whereby this shaft and the steering wheel may be turned by the attendant for directing the course of the carriage.

12 represents a prime mover mounted on the front part of the main frame of the carriage and preferably consisting of an explosion engine. On the main longitudinal driving shaft 13 of this engine is arranged a high speed driving sprocket wheel 14 which can either be disconnected from this shaft or it may be coupled with the same and turned at a comparatively high speed so that the power of the engine propels the machine comparatively rapidly when shifting the same from the plant to the job, or from one job to another. The means whereby the high speed driving sprocket wheel may be disconnected from the driving shaft or connected therewith and the driving means for moving the carriage slowly either forwardly or backwardly are preferably constructed as follows:

15, 16 represent backward and forward slow speed motion reversing drums, respectively, arranged side by side on the main driving shaft 13 in rear of the driving sprocket wheel 14. Each of these drums is adapted to be connected operatively on its interior with the main driving shaft by means of gearing which is rendered operative by holding the respective drum against turning and is also associated with means whereby the same may be coupled with the main driving shaft 13 and the driving sprocket wheel, these means being of well known construction.

The means whereby these two drums may be held against turning comprise two clamping bands 17, 18, which encircle the slow speed drums 15, 16, respectively, each of these bands having one of its ends engaging a stationary abutment 19 while the other end is adapted to be moved toward and from this abutment for either tightening or loosening the respective band on its drum. The tightening of these bands is effected by two horizontal shifting rods 20, 21, guided in ways 22 on the main frame. Each of these rods has a shifting sleeve 23 engaging with the free end of one of the clamping bands. Upon moving one or the other of these rods lengthwise toward the left from the position shown in Fig. 4, the corresponding clamping band will be tightened upon its companion drum, thereby holding the latter against turning and causing the carriage to be moved at a slow speed in one direction, while upon withdrawing this rod and moving the other rod forwardly, the other drum will be held against turning and cause the carriage to move slowly in the opposite direction, but when both rods are withdrawn then both drums are free and the carriage remains at rest so far as the operation of the slow speed mechanism is concerned. The longitudinal movement of these rods is effected by imparting a rotary motion thereto which is translated into a longitudinal motion by rotatable cams 24, 25, secured to these rods respectively and engaging with fixed cams 26, 27 arranged on the frame of the machine. This rod is moved lengthwise in a rearward direction by a spring 28 mounted on this rod between the ends of the clamping band and thereby loosen the latter from its drum, as shown in Fig. 4. The inclination of the co-operating surfaces of the two rotary cams 24, 25, and their companion fixed cams 26, 27, are reverse to one another so that upon simultaneously rotating these two rods in the same direction from a central neutral position, one of these rods will remain idle and the other will be shifted lengthwise forwardly for causing its companion band to grip the respective drum, and upon simultaneously turning these shifting rods in the opposite direction from a central position, then the previously-active shifting rod will be idle and the previously-inactive shifting rod will become active and move forwardly for causing its companion clamping band to engage the respective drum. The means for simultaneously turning these shifting rods in either direction from their neutral or central position preferably comprise an upright lever 29 pivoted on the main frame, two links 30, 31 connected with the lever 29, and two upright rock arms 32, 33, connected respectively with the shifting rods 20, 21 and the links 32, 33, as shown in Figs. 1 and 2.

As shown in Fig. 2, the hand lever 29 is in its central position so that both bands 17, 18 are loose and the slow speed mechanism is out of commission. Upon turning the lever 29 forward the band 18 will be tightened on the drums 16, thereby holding the latter stationary and causing the carriage to be propelled forwardly at a slow rate of speed. When pulling the lever 29 into its rearmost position the band 18 is loosened from the drum 16 and instead the band 17 is tightened on the drum 15, whereby the latter is held at rest and the carriage is caused to move backwardly slowly.

34 represents a longitudinally-movable clutch sleeve mounted on the rear part of the driving shaft 13 and adapted when moved forwardly to uncouple the internal gearing of both drums 15 and 16 from the shaft 13 and instead couple the latter with the driving sprocket wheel 14, so that the latter will be turned at a high rate of speed backwardly directly from the engine. This forward movement of the clutch sleeve 34 is effected preferably by a rotatable cam sleeve 35 interposed between the clutch sleeve 34 and an adjacent stationary part of the machine, as shown in Fig. 2. This rotatable sleeve 35 is provided on its front side with a cam face 36 engaging with a cam face 37 on the rear side of the clutch sleeve 34. The rotation of the cam sleeve 35 is effected by a transversely-swinging shifting lever 38 pivoted on the main frame and connected with an arm 39 on this cam sleeve by a link 40, as best shown in Fig. 2.

Motion is transmitted from the driving sprocket wheel 14 to the traction wheels of the carriage by means comprising a differential shaft composed of two sections 41, 41, journaled on the main frame, two driving chains 42, 42, each passing around a large sprocket wheel 43 secured to the axle of one of the traction wheels and around a small sprocket wheel 44 on the corresponding section of the differential shaft, a longitudinal intermediate shaft 45 journaled on the main frame, a driving chain 46 passing around the driving sprocket wheel 14 and a driven sprocket wheel 47 on the intermediate shaft 45 and a differential gearing arranged within a casing 48 and operatively connecting the intermediate shaft 45 with the opposing inner ends of the differential shaft sections. This differential gearing and also the reversing gearing of which the drums 15, 16 and bands 17, 18, form parts are of well known construction.

The means for transmitting motion from the engine to the traction wheels at different slow speeds when it is desired to move the carriage either forwardly or backwardly while the cutting mechanism is in operation, is preferably constructed as follows:

49 represents a driving friction disk adapted to be coupled with the rear end of the engine shaft 13. 50 represents a transverse intermediate shaft journaled on the main frame. On this shaft is splined a driven friction wheel 51 which has its periphery engaging with the driving friction wheel and which is compelled to turn with the shaft 50 but capable of sliding lengthwise thereon so that the periphery of the driven friction wheel may either be engaged with the central part of the driving friction wheel or moved radially with reference to the latter and engage the same at different distances from its axis. When the driven friction wheel engages the central part of the driving friction wheel, no motion will be communicated from the latter to the former, but when the driven friction wheel is moved away from the center of the driving friction wheel, then the driven friction wheel and the shaft upon which it is mounted will be turned either forwardly or backwardly at a higher speed. The shifting of the driven friction wheel may be effected by an upright hand lever 52 pivoted on the main frame, an elbow lever 53 pivoted on the main frame and having one of its arms connected by a link 54 with the hand lever 52, and a shifting lever 55 connected by a link 56 with the other arm of the elbow lever and having one of its ends provided with a pin 57 which engages with an annular groove 58 in the hub of the driven friction wheel while its opposite end is provided with a longitudinal slot 59 which receives a guide pin 60 arranged on the main frame, as best shown in Figs. 1 and 2.

61 represents a worm which is secured to the transverse intermediate shaft 50 above the longitudinal intermediate shaft 45 and 62 represents a worm wheel meshing with the underside of the worm and mounted on the longitudinal intermediate shaft 45. A clutch is provided whereby the worm may be coupled with the shaft 45 or uncoupled therefrom, which clutch may comprise a clutch sleeve 63 splined on the longitudinal shaft 45, and provided on its rear side with clutch teeth 64 which are adapted to be engaged with and disengaged from corresponding clutch teeth 65 on the front side of the hub of the worm wheel. Longitudinal movement of this clutch sleeve is effected by a shifting lever having upper and lower sections 66, 67, the lower one being pivoted on the main frame, and a fork 68 being pivoted on the lower section of this lever and engaging with a circumferential groove 69 on this clutch sleeve. This lever is yieldingly held in its rearward position in which the clutch sleeve is moved into its inoperative position by means of a spring 70 connected with the upper section of the lever and the main frame, as shown in Figs. 1 and 2. The shifting lever is locked in its forward or operative position by engaging the upper section of the same with a hook 71 on the main frame. The upper section 66 is pivoted on the lower section 67 by means of a pin 72 and yieldably connected therewith by means of a tension rod 73 passing through both of these lever sections and connected at its rear end with the lower lever section, and a spring 74 engaging with the front side of the upper lever section and a shoulder formed by a nut 75 on the tension rod.

The mechanism whereby the cutting of the asphalt is effected is constructed as follows:

76 represents a knife, blade or axe which has a vertically-reciprocating movement toward and from the surface of the pavement which is to be cut. The actual work of the knife is produced by a hammer-blow of the same against the pavement, this being obtained by a hammer which is raised and then permitted to drop so as to drive the knife into the asphalt. This hammer comprises a body 78 which is provided with a seat which engages with one side of the shank 77 of the knife and a clamping plate 79 engaging with the opposite side of this shank and connected with the body of the hammer by bolts 80, as shown in Figs. 5 and 6. The weight of this hammer may be increased or decreased by placing supplemental weight sections 81 thereon as required. The lifting of the hammer is effected by a hoisting chain, line or cable 82 which passes around an upper elevated guide pulley or sheave 83 and has one of its ends connected with the hammer and its other end connected with a hoisting drum 84. A yielding connection is provided between the hammer and hoisting line which comprises a clip 85 arranged on the hammer and provided with a pair of eyes 86 to which the lower end of the outer stretch of the hoisting chain is connected by a bolt 87. A yielding connection between this plate and the hammer body and sections is effected by bolts 88 arranged in the hammer and bearing against the clip, and springs 89 arranged within recesses 90 in the hammer and bearing against the tops of these recesses and screw nuts 91 on the coupling bolts, as best shown in Figs. 5 and 6.

An upward extension 92 of the main frame is arranged on the front end thereof and preferably has the form of a tower. The overhead guide pulley 83 is mounted on the top of this tower above the hammer, and the hoisting drum 84 is mounted on a hoisting shaft 93 journaled horizontally and lengthwise in suitable bearings on the tower about midway of its height.

The means for guiding the hammer in its working movement comprise two upright guide rails or tracks 95, 95, which engage with upright grooves 96 in the sides of the hammer, as best shown in Figs. 1, 5, 6 and 7.

The hammer tracks or guide rails are mounted by means of horizontal longitudinal pivots 97 on the upper part of the tower so that the lower ends of these guide rails can swing in a vertical plane transversely of the machine, this movement of the rails being yieldingly resisted by means which comprises two horizontal tension rods 98 connected at their outer ends with the lower ends of the guide rails while their inner ends pass through openings in an intermediate member 99 of the main frame which member forms an abutment, and two buffer springs 100, 101, applied to each of the tension rods and bearing with their opposing ends against opposite sides of the abutment 99 while their opposite extremities engage with shoulders 102, 103 on the respective tension rod.

The shaft 93 on which the hoisting drum is mounted turns continuously in the direction in which the drum must turn for winding the hoisting chain or belt thereon when the machine is in operation, this being preferably accomplished by means of a driving gear wheel 105 secured to the engine shaft 13, a driven gear wheel 106 secured to the drum shaft 93 and an intermediate gear wheel 104 journaled on the adjacent part of the main frame and meshing with the driving and driven gear wheels 105, 106, as best shown in Fig. 4. On its front side the driven sprocket wheel 106 is provided with a clutch disk 119 on which is mounted an annular clutch shoe 108 and adapted to engage with a correspondingly shaped groove 109 in a clutch disk 118 formed on or connected with the hoisting drum 84. The latter and the driven clutch disk 118 are movable lengthwise on the hoisting shaft 93 for the purpose of engaging and disengaging the co-operating surfaces of the driving and driven clutch disks 119, 118.

Means are provided whereby, when the hammer effects the last part of its downward stroke, an automatic coupling of the hoisting drum 84 with the hoisting shaft 93 is effected so that the lifting of the hammer commences immediately after the knife or blade has been driven into the asphalt and when the hammer approaches the end of its upward stroke the hoisting clutch is automatically uncoupled so as to disengage the hoisting drum from the hoisting shaft and permit the hammer to again drop by gravity and drive the knife with a blow into the surface of the asphalt. In its preferred form this mechanism for automatically coupling and uncoupling the clutch is constructed as follows:

114 represents a tripping carrier which is preferably constructed in the form of a yoke and mounted on the front part of the hoisting shaft so as to be capable of rocking about the axis thereof, the rear part of this carrier being preferably journaled directly on this shaft while the front end thereof is journaled on a supporting sleeve 214 which is mounted on the adjacent part of the hoisting shaft and which engages its front end with the adjacent front bearing 215 in which the corresponding end of the hoisting shaft is journaled, as best shown in Fig. 7. On its rear side the rocking carrier is provided with a cam 115 which engages with a correspondingly shaped cam 116 formed on the front side of a sleeve 117 which is mounted on the adjacent part of the hoisting shaft 93 and is capable of longitudinal movement thereon but normally held against rotation about the axis of this shaft. The thrust of the cam sleeve 117 is transmitted to the hoisting drum and driven clutch disk 118 for the purpose of coupling the clutch by means of a thrust collar 142 mounted on the hoisting shaft and engaging with the rear side of the thrust cam sleeve 117, a gear wheel 120 which is secured to the front end of the hoisting drum and performs an additional function which will be hereinafter referred to, and a thrust ball bearing 220 interposed between the thrust sleeve 142 and the gear wheel 120. Within the yoke-shaped carrier is arranged a ratchet wheel 107 which is secured to the hoisting shaft and bears with its front side against the supporting sleeve 214 while its rear side engages with the rear part of the yoke-shaped carrier through the medium of a ball thrust bearing 207. This ratchet wheel performs an additional function which will presently appear, but it incidentally serves as part of the means for holding the tripping yoke or carrier against forward motion relative to the hoisting shaft. Upon turning the tripping yoke anti-clockwise about the hoisting shaft as indicated by the dotted arrow in Fig. 14, the driving trip cam 115 of this yoke by engaging with the driven trip cam 116 causes the latter to be pushed rearwardly relatively to the hoisting shaft which motion is transmitted successively through the thrust sleeve 142, ball bearing 220 and gear wheel 120 to the hoisting drum and driven clutch disk so as to cause the latter to grip the shoe of the driving clutch disk 119 and thereby couple the hoisting drum with the hoisting shaft, causing the hoisting chain to be wound on the drum and the hammer to be lifted. Upon turning the tripping yoke in the opposite direction or clockwise, as indicated by the full arrow in Fig. 14, the trip cam 115 of the same relaxes its rearward pressure against the driven trip cam 116 and permits the driven clutch disk 118 to release its grip upon the shoe of the driving clutch disk 119, the clutch disks being separated at this time by a spring 219 interposed between the hubs of the same, as shown in Fig. 7, thereby uncoupling the hoisting drum from the hoisting shaft and permitting the hammer to drop by gravity inasmuch as at this time the drum is free and the hoisting chain turns the same backwardly as it unwinds therefrom.

128 represents a dog or pawl which is pivoted on the tripping yoke and adapted to engage with the nose on its lower arm against one or another of the teeth of the ratchet wheel 107 for the purpose of coupling the yoke temporarily with the hoisting shaft 93 during a part of the rotation of the latter. Yielding means are provided which tend to engage this dog with the ratchet wheel when the parts are free to do so, which means are so organized that they also serve to turn the yoke backwardly at the proper time or anti-clockwise. These means, as best shown in Figs. 8–14 comprise inner and outer arms 111, 110 which for convenience are loosely mounted on a rock shaft 124 journaled on the adjacent part of the main frame and used primarily for another purpose as will appear later on, a link 113 connecting the inner arm 111 with the upper arm of the dog 128 and a spring 109 connecting the outer rock arm 110 with an adjacent fixed part of the main frame. When the yoke has been turned forwardly or clockwise to the end of its stroke the same is temporarily held in this position by means of a detent device which comprises a hold-out lever 133 pivoted at one end and provided with a weight 233 at its opposite end while its intermediate part is provided with a hold-out latch 234 adapted to be engaged at its front edge by means of a shoulder 235 on the tripper yoke. This latch is yieldingly mounted on the hold-out lever and is preferably constructed in the form of a plate which is arranged on the underside of the hold-out lever and bears pivotally at its rear end against a shoulder on the hold-out lever and the same is yieldingly held in its depressed position by means of a leaf spring 236 secured to the top of the hold-out lever by bearing against the upper end of a pin 237 which is secured to the upper side of the hold-out latch and projects through an opening in the hold-out lever, as shown in Fig. 14. The downward movement of this latch is limited by providing the pin 237 with a head which serves as a stop by engaging with the upper side of the hold-out lever, as shown in Fig. 14.

During the last part of the bodily forward or clockwise motion of the dog or pawl with the tripping yoke and immediately after the latter engages with the hold-out latch the dog 128 is automatically disengaged from the ratchet wheel by means of a knock-out device which preferably consists of a knock-out cam 130 which has its cam face arranged above the adjacent part of the ratchet wheel and is mounted on the hoisting shaft but held against turning by means of a rod 230 which connects the same with an adjacent part of the main frame so as to be stationary.

During the last part of the forward movement of the dog its nose engages with the knock-out cam 130 so that the dog is disengaged from the ratchet wheel and at this time the pivotal connection between the dog and the link 113 passes below the pivotal connection between the dog and the tripping yoke so that the tension of the spring 109 operates to yieldingly hold the dog out of engagement from the ratchet wheel as long as the tripping yoke is in its foremost position, the position of these parts being indicated by dotted lines in Fig. 14. While the parts are in this position the hammer is being elevated by the hoisting drum by reason of the co-operating cams 115, 116 pressing the clutch members 118, 119 together. When the hammer approaches the upper end of its stroke the hold out lever 133 is disengaged from the shoulder 235 of the tripping yoke so that now the pull of the return spring 109 is able to reverse the motion of the dog 128 and by its pull on the latter to also rock the tripping yoke backwardly relatively to the direction of rotation of the hoisting shaft and the ratchet wheel. During this return motion of the tripping yoke and for some time after reaching the end of this motion the nose of the dog or pawl 128 is prevented from re-engaging the ratchet wheel inasmuch as such re-engagement must be delayed until the hammer has reached the lower part of its downward stroke and delivered a cutting blow of its knife to the asphalt. A timing device is therefore provided which controls the re-engagement of the dog with the ratchet wheel which timing device also operates to disengage the hold-out lever from the tripping yoke. In its preferred form this timing device is constructed as follows:

126 represents a pilot cam which preferably turns concentrically with the hoisting shaft by mounting the same thereon between the ratchet wheel and the adjacent rear part of the tripping yoke. This pilot cam is provided with a peripheral cam face which engages with the nose of the dog 128 and only permits the latter to engage with the ratchet wheel when the dog passes from the high to the low part of the face of this pilot cam. This pilot cam is rocked alternately in opposite directions by motions derived from the hoisting drum as the same is turned forwardly and backwardly as the hoisting chain is wound thereon and unwound therefrom. The preferred mechanism for thus transmitting motion from the hoisting drum to the pilot cam, as shown in Figs. 10 and 11 include the rock shaft 124 journaled on the main frame and a train of reducing gears including the driving gear pinion 120 on the drum, a driven gear wheel 123 secured to the rock shaft 124, and an intermediate shaft 224 journaled on the main frame and provided with an intermediate gear wheel 121 which meshes with the driving gear pinion 120 and also provided with an intermediate gear pinion 122 which meshes with the driven gear wheel 123. On the rock shaft 124 is mounted an eccentric 324 which is surrounded by an eccentric strap 325 having an arm 326 which projects upwardly and is adapted to engage at its upper end with an adjusting screw 327 secured to the hold-out lever 133 arranged immediately above the same. 328 represents a pilot rock lever which is connected at its free end by means of a link 329 with the pilot cam and which is connected between its ends by a slack connection with the eccentric arm 326 so that the latter is capable of moving part of the time independently of the pilot rock lever 328 while at other times this rock lever and pilot cam connected therewith are compelled to move with the eccentric arm. This slack connection is preferably effected by means of a pin 330 mounted on the rock lever 328 and engaging with a slot 331 in the eccentric arm.

For the purpose of adjusting the stroke of the hammer to suit the character of the work which is being done and other conditions, the fulcrum of the hold-out lever 133 and of the pilot lever 328 are made adjustable and the preferred means for this purpose are so organized that the adjustments of the fulcrum of these two levers are effected simultaneously as shown in Figs. 11 and 14. This adjusting mechanism includes an upper hold-out rock shaft 400 journaled in suitable bearings on the main frame and provided with an eccentric 401 on which the hold-out lever is pivoted, a lower pilot rock shaft 403, a lower pilot arm 404 which is mounted on the pilot rock shaft 403 and to which the pilot lever 328 is pivoted, a pair of upper and lower transmitting rock arms 405, 406 secured respectively to the upper and lower rock shafts 400, 403 and connected with each other by means of a link 407, an adjusting arm 408 secured to the upper rock shaft 400, and a shipper rod 409 connected at its inner end with the adjusting arm 408 while its outer end is provided with a pin 410 adapted to engage with one or another of a series of notches 411 in a locking bar which is arranged on the adjacent part of the main frame.

In the position of the parts indicated in Figs. 9 and 11 the dog 128 and tripping yoke 114 are effecting the last part of their return or anti-clockwise movement and the dog is still in engagement with the salient or high part of the pilot cam, at which time the hoisting clutch 118, 119 is still coupled and the hoisting drum is connected with the hoisting shaft, so that the hammer is raised. During this time the eccentric 324 is moving from its upper position shown by full lines in Fig. 11 toward its lower position, as shown by full lines in Fig. 14, by means of the train of gears 120, 121, 122, 123, whereby the pilot rock shaft 124 is operatively connected with the hoisting drum while the latter is winding the hoisting chain thereon and raising the hammer. As the eccentric moves from its upper toward its lower position the first part of this movement is idle so far as the pilot cam is concerned by reason of the pin and slot connection between the eccentric arm 326 and the pilot lever 328, but during the latter part of the downward motion of the eccentric, the upper end of the slot 331 in the eccentric arm engages with the pin 330 of the pilot lever, so that the latter now is compelled to descend with the eccentric 324 and cause the pilot cam to be turned backwardly. The instant the pilot cam is turned backwardly sufficiently to present an abrupt step between its high and low parts to the nose of the dog 128, then the latter is turned with its nose into engagement with the adjacent teeth of the ratchet wheel by means of the spring 109 which is operatively connected therewith and constantly tends to pull the dog in this direction. The parts are so timed that when this engagement of the dog with the ratchet wheel occurs, the hammer is nearly in its uppermost position and the clutch 118, 119 will be opened or thrown out in order to disconnect the hoisting drum from the hoisting shaft. Such uncoupling of this clutch occurs immediately after the dog is engaged with the ratchet wheel by reason of the fact that the dog and tripping yoke at this time are now coupled with the hoisting shaft and are compelled to turn therewith in a forward direction, as indicated by the full line arrow in Fig. 14, whereby the driving trip cam 115 of the trip yoke moves in a direction for bringing its low face opposite the low face of the driven trip cam 116, thereby releasing the pressure of the driven clutch disk 118 against the shoe of the driving clutch disk 119 and permitting the clutch spring 219 to separate the clutch disks 118, 119 sufficiently to disconnect the hoisting drum from the hoisting shaft. The extent of the forward movement which at this time is imparted to the carrier yoke is about one quarter of a turn and extends from the position shown by full lines in Figs. 9 and 11 to the position shown by dotted lines in the same figures.

During the last part of the forward movement of the tripping yoke its shoulder 235 moves behind the front or locking edge of the hold-out latch 234 and immediately thereafter the nose of this dog rides up on the high part of the stationary knock out cam 130, so that the dog is disengaged from the ratchet wheel 107 and further forward rotation of the tripping yoke together with the dog is prevented, but backward rotation of the yoke at this time is prevented by reason of the engagement of the latter with the latch 234 of the hold-out lever. Owing to the changed position of the tripping yoke and the dog at the time that the nose of the latter is disengaged from the ratchet wheel by the knock-out cam, the pivotal connection between the upper arm of the dog and the shifting link 113 passes below the dead or center line of the pivotal connection between the dog and the tripping yoke, so that the pull of the spring 109 at this time operates to hold the dog yieldingly away from the ratchet wheel instead of tending to throw the same toward this wheel, this position of the dog and associated parts being shown by dotted lines in Fig. 14.

The hoisting clutch 118, 119 is now fully released and the hoisting drum disconnected from the hoisting shaft, which permits the hammer to drop from its upper to its lower position and produce a cutting blow of the blade on the asphalt. During the descent of the hammer, the hoisting drum turns backwardly by reason of the unwinding of the hoisting chain therefrom and this backward turning movement of the drum causes the eccentric 324 to be turned from its lower position indicated by full lines in Fig. 14 to its upper position shown by full lines in Fig. 11 by reason of the train of gears 120—123 which operatively connect this eccentric with the hoisting drum. During the first part of this upward movement of the eccentric the pilot cam 126 is also moved in the same direction by reason of a weighted return lever 533 which is connected by a link 534 with the pilot lever 328 having the slack connection with the eccentric arm 326 by means of a pin-and-slot 330, 331. The upward movement of the pilot cam is arrested the instant that the weighted lever 533 engages a fixed stop 535 at which time the pilot cam is in such a position that if the dog is moved with its nose toward the ratchet wheel this nose cannot engage with the teeth of the ratchet wheel until the pilot cam has been turned backwardly the required distance to permit of such engagement. After the pilot cam has reached its uppermost position the eccentric 324 completes its upward movement and during the last part of this movement the upper end of the arm 326 of the eccentric 324 engages with the screw 327 on the hold-out lever and causes the latter to be lifted, so that its latch 234 is disengaged from the tripping yoke and permits the return spring 109 to reverse the position of the dog on the yoke and also pull the yoke backwardly about a quarter of a turn relatively to the hoisting shaft. This action of the yoke causes the hoisting clutch 118, 119 to be again coupled and the hoisting drum to be again connected with the hoisting shaft, so that the hammer is raised by the winding of the hoisting chain on the drum preparatory to again dropping the hammer. At this time the pivotal connection between the dog and the shifting link 113 connected therewith has passed above a line extending from the fulcrum of the dog to the pivotal connection between the link 113 and the rock arm 111, so that the pull of the spring 109 now tends to move the nose of the dog toward the ratchet wheel but actual engagement of this nose with this wheel is at this time prevented by reason of the presence of the high part of the pilot cam which is engaged by the nose of the dog, as before described.

During the first part of the downward movement of the pilot eccentric 324 it is moving idle so far as the pilot cam is concerned but the hold-out lever 133 which at this time is resting on the eccentric arm 326 is lowered until it rests upon the stop 536 after which this eccentric arm moves downwardly independently of the hold-out lever. During the continued downward movement of this eccentric, it is idle until it reaches that part of its stroke in this direction when the upper end of the slot 331 in the eccentric arm engages with the pin 330 on the intermediate pilot lever after which it turns the pilot-cam backwardly. This downward movement of the eccentric at this time is effected by the train of gearing 120—123 which connects the same with the hoisting drum, which latter at this time is coupled by the clutch 118, 119 with the hoisting shaft, so that the hammer is being elevated. During the last part of the downward motion of the eccentric 324 the hammer is effecting the last part of its upward motion and the pilot cam the last part of its backward motion. The instant the pilot cam has been moved backwardly sufficiently to present an abrupt step between the low and high parts of its face to the dog, the latter is turned by the spring 109 so as to engage the nose of the dog with the ratchet wheel, thereby causing the yoke to be again turned forwardly, quickly, so that the driving trip cam 115 on this yoke by moving backwardly relatively to the driven trip cam 116 releases the clutch 118, 119 and permits the drum to again unwind and allow the hammer to drop. At the end of the forward movement of the yoke the shoulder 235 thereof again passes behind the latch 234, so that the yoke is held against backward motion and immediately thereafter the dog engages with the knock-out cam and is thrown out of engagement from the ratchet wheel. This cycle of operations is repeated in the manner just described for effecting the successive raising and dropping operations of the hammer.

The position of the screw 327 on the hold-out lever, which engages with the upper end of the eccentric arm 326 determines the time for operating the clutch 118, 118 so as to begin the upward movement of the hammer, and by adjusting this screw the time of this upward movement of the hammer may therefore be set so that the operations are performed at the proper time.

When it is desired to adjust the stroke of the hammer the actuating arm 408 is rocked either forwardly or backwardly by means of the shipper rod 409 whereby the eccentric 401 either raises or lowers the fulcrum of the hold-out lever 133 and the vertical movement of the lower pilot fulcrum arm 404 raises or lowers the fulcrum of the pilot lever 328. By shifting these arms 408, 405, so as to lower the fulcrums of these levers, the pilot eccentric 324 is compelled to move downwardly a greater extent before taking up the slack connection between the eccentric arm 326 and the pilot lever 328, thereby causing the hammer to be raised to a higher point before the clutch 118, 119 is thrown out, while upon raising the fulcrum of these levers less downward movement on the part of the pilot eccentric 324 is required before the clutch 118, 119 is thrown out and thereby decreasing the stroke of the hammer accordingly.

Means are provided for holding the hammer in its elevated position when the machine is moved from place to place. This is accomplished by means of a clamping device which preferably comprises a brake drum 600 formed on the driven clutch disk 118, a brake band 601 surrounding the brake drum, a brake shaft 602 journaled in bearings on the adjacent part of the main frame, a tightener arm 603 secured to the brake shaft and connected with one end of the brake band, the opposite end of the latter being connected with the brake shaft or other suitable stationary part, and a brake lever 604 connected with the brake shaft and adapted to be engaged with one or another of a vertical row of notches 605 formed in a bracket 606 on the main frame for holding the brake band either in its fully tightened or fully released, or in an intermediate position.

It is desirable to prevent the brake band from being tightened against the brake drum while the hoisting drum is lifting the hammer inasmuch as this is liable to stall the engine and leave the hammer hanging midway of its stroke and subsequently drop at an inopportune time upon releasing the brake band. To prevent this, means are provided which prevent the operation of this holding device at any time other than when the hammer has reached the upper part of its stroke and the preferred means for this purpose are associated with the pilot cam operating mechanism. These means, as shown for instance in Figs. 9, 14 and 13 comprise a stop arm 607 which is arranged on the brake-shaft 602 and is adapted to overhang the inner trip arm 111 of the yoke-actuating mechanism. When this trip arm is in its retracted position together with the tripping yoke and the dog while the hammer is ascending, as shown by dotted lines in Fig. 9, and by full lines in Fig. 14, the stop arm 607 on the brake shaft is arranged above the trip arm 111, so that the latter prevents this stop arm from descending and consequently prevents the brake lever from being turned in the direction which would tighten the brake band on the brake drum. When, however, the trip arm 111 is moved forwardly together with the tripping yoke and dog for the purpose of uncoupling the hoisting clutch, 118, 119 this trip arm is moved out of the path of the stop arm 607, so that the latter can now be moved downwardly by the operation of the brake lever 604, and thus permit the brake to be applied so that the hammer may be held in an elevated position by engaging the handle of the brake lever with one of the lower notches of the locking bracket 606.

Means are provided for taking up wear between the cooperating surfaces of the parts interposed between the tripping yoke and the driven clutch disk, so as to insure coupling and uncoupling of the clutch 118, 119 at the proper time. This is preferably effected by rotatably adjusting the driven trip cam 115 circumferentially about the axis of the hoisting shaft, so that the cooperating cam surfaces of the driving and tripping cams 115, 116 are advanced relatively to each other in accordance with the wear on the several parts which transmit motion to and from the hoisting clutch. Although various means may be provided for effecting this rotatable adjustment of the driven tripping cam 116, those means which are shown in the drawings (see Figs. 2, 4, 8, 9 and 10) comprise a horizontal adjusting shaft 608 journaled in suitable bearings on the main frame and provided at one end with a handle or crank 609 for turning the same, a rock arm 610 projecting laterally from the driven trip cam 116, an internally screw threaded sleeve or nut 611 pivoted on the cam arm 610, a screw shaft 612 provided at its lower end with an external screw thread which engages with the screw sleeve 611, a hanger 620 pivotally mounted upon the adjusting shaft 608 and provided with a bearing in which the upper part of the screw shaft is journaled, and a worm 614 secured to the adjusting shaft 608 and meshing with a worm wheel 615 on the upper end of the screw shaft 612. It will be apparent that by turning the adjusting shaft 608 in one direction or the other, that the screw shaft 612 will be turned in one direction or the other and cause the driven tripping cam 116 to be adjusted circumferentially about the hoisting shaft, so that it may be brought into the proper position for engagement with the driving tripping cam 115 and cause the hoisting clutch to be coupled and uncoupled at the proper time.

It is desirable to provide means for locking the yoke and its associated parts in their forward position and thus hold the hammer safely in its elevated position, so that the same is not likely to drop while the machine is being hauled from place to place over rough ground, and this is preferably accomplished by means of a locking hook 616 mounted on any suitable stationary part of the machine and adapted to engage with a pin 617 on the outer trip arm 110 when the latter is in its foremost position.

This mechanism for controlling the operation of the hammer and varying the stroke of the same is very efficient and reliable inasmuch as it is not liable to get out of order or operate erratically when a supporting wheel of the machine strikes a stone or drops in a hole in the road. Furthermore, this mechanism permits the hammer to be operated very rapidly without liability of missing any strokes and thus enable a full output to be obtained from the same at all times.

I claim as my invention:

1. A hammer operating mechanism for asphalt cutters comprising a shaft turning continuously in the same direction, a hoisting drum mounted on said shaft and adapted to turn alternately in opposite directions, a clutch for connecting and disconnecting said shaft and drum, and means for coupling and uncoupling said clutch responsive to the motion of said drum, and including a ratchet wheel turning constantly with said shaft and a dog movable into and out of engagement from said ratchet wheel, and operatively related to said drum.

2. A hammer operating mechanism for asphalt cutters comprising a shaft turning continuously in the same direction, a hoisting drum mounted on said shaft and adapted to turn alternately in opposite directions, a clutch for connecting and disconnecting said shaft and drum, and means for coupling and uncoupling said clutch responsive to the motion of said drum and including a ratchet wheel turning constantly with said shaft, a dog movable into and out of engagement from said ratchet wheel, a carrier rotatable concentric relative to said drum and ratchet wheel and supporting said dog, and spring operated means for moving said carrier backwardly and moving said dog into engagement with said ratchet wheel.

3. A hammer operating mechanism for asphalt cutters comprising a shaft turning continuously in the same direction, a hoisting drum mounted on said shaft and rotatable alternately in opposite directions, a clutch for connecting and disconnecting said drum and shaft, and means for controlling the coupling and uncoupling of said clutch responsive to the motion of said drum and including a ratchet wheel turning with said shaft, a carrier mounted loosely on said shaft, a dog mounted on said carrier and co-operating with said ratchet wheel, yielding means tending to move said dog into engagement with said ratchet wheel and move said carrier backwardly, a pilot cam which controls the engagement of the dog with said ratchet wheel, means interposed between said drum and pilot cam for shifting the latter, and a knock-out cam which disengages said dog from said ratchet wheel during the last part of its forward stroke.

4. A hammer operating mechanism for asphalt cutters comprising a shaft turning continuously in the same direction, a hoisting drum mounted on said shaft and rotatable alternately in opposite directions, a clutch for connecting and disconnecting said drum and shaft, and means for controlling the coupling and uncoupling of said clutch responsive to the motion of said drum and including a ratchet wheel turning with said shaft, a carrier mounted loosely on said shaft, a dog mounted on said carrier and co-operating with said ratchet wheel, yielding means tending to move said dog into engagement with said ratchet wheel and move said carrier backwardly, a pilot cam which controls the engagement of the dog with said ratchet wheel, means interposed between said drum and pilot cam for shifting the latter, a knock-out cam which disengages said dog from the ratchet wheel during the last part of its forward stroke, and a hold out latch adapted to engage said carrier and retain the same in its forward position.

5. A hammer operating mechanism for asphalt cutters comprising a shaft turning continuously in the same direction, a hoisting drum mounted on said shaft and rotatable alternately in opposite directions, a clutch for connecting and disconnecting said drum and shaft, and means for controlling the coupling and uncoupling of said clutch responsive to the motion of said drum and including a ratchet wheel turning with said shaft, a carrier mounted loosely on said shaft, a dog mounted on said carrier and co-operating with said ratchet wheel, yielding means tending to move said dog into engagement with said ratchet wheel and move said carrier backwardly, a pilot cam which controls the engagement of the dog with said ratchet wheel, means interposed between said drum and pilot cam for shifting the latter, a knock-out cam which disengages said dog from the ratchet wheel during the last part of its forward stroke, a hold out latch adapted to engage said carrier and retain the same in its forward position, and means for disengaging the hold out latch from said carrier during the backward motion of said drum.

6. A hammer operating mechanism for asphalt cutters comprising a shaft turning continuously in the same direction, a hoisting drum mounted on said shaft and rotatable alternately in opposite directions, a clutch for connecting and disconnecting said drum and shaft, and means for controlling the coupling and uncoupling of said clutch responsive to the motion of said drum and including a ratchet wheel turning with said shaft, a carrier mounted loosely on said shaft, a dog mounted on said carrier and cooperating with said ratchet wheel, yielding means tending to move said dog into engagement with said ratchet wheel and move said carrier backwardly, a pilot cam which controls the engagement of the dog with said ratchet wheel, a weighted lever operatively connected with the pilot cam and tending to move the same forwardly, and means operated from the drum for moving said pilot cam backwardly.

7. A hammer operating mechanism for asphalt cutters comprising a shaft turning continuously in the same direction, a hoisting drum mounted on said shaft and rotatable alternately in opposite directions, a clutch for connecting and disconnecting said drum and shaft, and means for controlling the coupling and uncoupling of said clutch responsive to the motion of said drum and including a ratchet wheel turning with said shaft, a carrier mounted loosely on said shaft, a dog mounted on said carrier and cooperating with said ratchet wheel, yielding means tending to move said dog into engagement with said ratchet wheel and move said carrier backwardly, a pilot cam which controls the engagement of the dog with said ratchet wheel, means interposed between said drum and pilot cam for shifting the latter, a knock-out cam which disengages said dog from the ratchet wheel during the last part of its forward stroke, a hold out latch adapted to engage said carrier and retain the same in its forward position, and a weighted hold-out lever carrying said hold-out latch.

8. A hammer operating mechanism for asphalt cutters comprising a shaft which turns continuously in the same direction, a hoisting drum mounted on said shaft and rotatable alternately in opposite directions, a clutch for connecting and disconnecting said shaft and drum including clutch members operatively associated with said drums and shaft and adapted to be engaged and disengaged by lengthwise movement of said drum and its companion clutch member relative to the shaft and its companion clutch member, a relatively stationary clutch cam mounted on said shaft, a rotatable clutch cam engaging the stationary clutch cam and operating when turned forwardly to press the drum clutch member against the shaft clutch member and couple the same, and means for alternately turning said rotatable clutch cam in opposite directions including a rachet wheel secured to said shaft, a carrier rotatably mounted on said shaft, a dog pivoted on said carrier and adapted to engage one of its arms with said carrier and also with said ratchet wheel, a link connected at one end with the other arm of said dog, a rock arm connected with said link, a spring associated with said last mentioned arm and operating to pull the same and the parts connected therewith backwardly, a pilot cam rotatably mounted on said shaft and adapted to control the engagement of said dog with said ratchet wheel, a link connected with said pilot cam, an intermediate rock lever connected with said link, a weighted pilot lever, a link connecting said pilot lever with said intermediate lever, an eccentric having a slack connection with said intermediate lever, a gear train connecting said drum with said eccentric, a knock-out cam which controls the disengagement of said dog from the ratchet wheel, a hold-out latch adapted to be engaged by said carrier in the forward position of the latter, and a weighted latch lever which carries said hold-out latch and which is adapted to be shifted by said eccentric arm for disengaging said hold-out latch from said carrier.

9. A hammer operating mechanism for asphalt cutters comprising a shaft which turns continuously in the same direction, a hoisting drum mounted on said shaft and rotatable alternately in opposite directions, a clutch for connecting and disconnecting said shaft and drum including clutch members operatively associated with said drum and shaft and adapted to be engaged and disengaged by lengthwise movement of said drum and its companion clutch member relative to the shaft and its companion clutch member, a relatively stationary clutch cam mounted on said shaft, a rotatable clutch cam engaging the stationary clutch cam and operating when turned forwardly to press the drum clutch member against the shaft clutch member and couple the same, and means for alternately turning said rotatable clutch cam in opposite directions including a ratchet wheel secured to said shaft, a carrier rotatably mounted on said shaft, a dog pivoted between its arms on said carrier and adapted to engage its front arm with said ratchet wheel, a link connected at one end with the other arm of said dog, a rock arm connected with said link, a spring associated with said last mentioned arm and operating to pull the same and the parts connected therewith backwardly, a pilot cam rotatably mounted on said shaft and adapted to control the engagement of said dog with said ratchet wheel, a link connected with said pilot cam, an intermediate rock lever connected with said link, a weighted pilot lever, a link connecting said pilot lever with said intermediate lever, an eccentric having a slack connection with said intermediate lever, a gear train connecting said drum with said eccentric, a knock-out cam which controls the disengagement of said dog from the ratchet wheel, a hold-out latch adapted to be engaged by said carrier in the forward position of the latter, and a weighted latch lever which carries said hold-out latch and which is provided with an adjusting screw adapted to be engaged by said eccentric arm for disengaging said hold-out latch from said carrier.

10. A hammer operating mechanism for asphalt cutters comprising a shaft which turns continuously in the same direction, a hoisting drum mounted on said shaft and rotatable alternately in opposite directions, a clutch for connecting and disconnecting said shaft and drum including clutch members operatively associated with said drum and shaft and adapted to be engaged and disengaged by lengthwise movement of said drum and companion clutch member, a relatively stationary clutch cam mounted on said shaft, a rotatable clutch cam engaging the stationary clutch cam and operating when turned forwardly to press the drum clutch member against the shaft clutch member and couple the same, and means for alternately turning said rotatable clutch cam in opposite directions including a ratchet wheel secured to said shaft, a carrier rotatably mounted on said shaft, a dog pivoted between its arms on said carrier and adapted to engage its front arm with said ratchet wheel, a link connected at one end with the other arm of said dog, a rock arm connected with said link, a spring associated with said last mentioned arm and operating to pull the same and the parts connected therewith backwardly, a pilot cam rotatably mounted on said shaft and adapted to control the engagement of said dog with said ratchet wheel, a link connected with said pilot cam, an intermediate rock lever connected with said link, a weighted pilot lever, a link connecting said pilot lever with said intermediate lever, an eccentric having a slack connection with said intermediate lever, a gear train connecting said drum with said eccentric, a knock-out cam which controls the disengagement of said dog from the ratchet wheel, a hold-out latch adapted to be engaged by said carrier in the forward position of the latter, a weighted latch lever which carries said hold-out latch and which is adapted to be shifted by said eccentric arm for disengaging said hold-out latch from said carrier, and means for adjusting the fulcrums of said intermediate lever and said latch lever.

11. A hammer operating mechanism for asphalt cutters comprising a shaft which turns continuously in the same direction, a hoisting drum mounted on said shaft and rotatable alternately in opposite directions, a clutch for connecting and disconnecting said shaft and drum including clutch members operatively associated with said drum and shaft and adapted to be engaged and disengaged by lengthwise movement of said drum and companion clutch member relative to the shaft and its companion clutch member, a relatively stationary clutch cam mounted on said shaft, a rotatable clutch cam engaging the stationary clutch cam and operating when turned forwardly to press the drum clutch member against the shaft clutch member and couple the same, and means for alternately turning said rotatable clutch cam in opposite directions including a ratchet wheel secured to said shaft, a carrier rotatably mounted on said shaft, a dog pivoted between its arms on said carrier and adapted to engage its front arm with said ratchet wheel, a link connected at one end with the other arm of said dog, a rock arm connected with said link, a spring associated with said last mentioned arm and operating to pull the same and the parts connected therewith backwardly, a pilot cam rotatably mounted on said shaft and adapted to control the engagement of said dog with said ratchet wheel, a link connected with said pilot cam, an intermediate rock lever connected with said link, a weighted pilot lever, a link connecting said pilot lever with said intermediate lever, an eccentric having a slack connection with said intermediate lever, a gear train connecting said drum with said eccentric, a knock-out cam which controls the disengagement of said dog from the ratchet wheel, a hold-out latch adapted to be engaged by said carrier in the forward position of the latter, a weighted latch lever which carrier said hold-out latch and which is adapted to be shifted by said eccentric arm for disengaging said hold-out latch from said carrier, and means for adjusting the fulcrums of said intermediate lever and said latch lever comprising a lower rock shaft having two rock arms on one of which said intermediate lever is pivoted, and an upper rock shaft having an arm connected with the other rock arm of said lower rock shaft and also having an eccentric on which said latch lever is pivoted.

12. A hammer operating mechanism for asphalt cutters comprising a driving shaft, a hoisting mechanism, a clutch for connecting and disconnecting the driving shaft and hoisting mechanism, a brake mechanism associated with said hoisting mechanism, means for controlling the operation of said clutch, and means for preventing said brake mechanism from being operated when the hoisting mechanism is performing its lifting operation.

13. A hammer operating mechanism for asphalt cutters comprising a driving shaft, a hoisting drum mounted on said shaft, a clutch for connecting and disconnecting said shaft and drum, a brake drum connected with said hoisting drum, a brake band applied to said drum, a brake lever connected with said band, a stop arm moving with said brake lever, and means for controlling the operation of said clutch having a movable member which is arranged in the path of said stop arm while the hoisting drum is moving forwardly and winding up and out of said path when the drum is moving backwardly and unwinding.

14. A hammer operating mechanism for asphalt cutters comprising a driving shaft, a hoisting drum mounted on said shaft, a clutch for connecting and disconnecting said shaft and drum, a brake drum connected with said hoisting drum, a brake band applied to said drum, a brake lever connected with said band, a stop arm moving with said brake lever, and means for controlling the operation of said clutch having a movable member which is arranged in the path of said stop arm while the hoisting drum is moving forwardly and winding up and out of said path which the drum is moving backwardly and unwinding, said means including a ratchet wheel secured to said shaft, a carrier rotatable about said shaft, a dog mounted on said carrier and adapted to engage said ratchet wheel, and operatively connected with said movable member.

15. A hammer operating mechanism for asphalt cutters comprising a driving shaft, a hoisting drum mounted on said shaft, a clutch for connecting and disconnecting said drum and shaft, and adjustable means for coupling and uncoupling said clutch including a driven clutch cam operatively related to said clutch and movable lengthwise of said shaft, a driving clutch cam co-operating with said driven clutch cam and rotatable about said shaft, and means for circumferentially adjusting said driven clutch cam comprising a screw sleeve pivotally mounted on said driven clutch cam, a screw shaft having a thread working in said screw sleeve, a pivotally supported hanger having a bearing in which said screw shaft is journaled, adjustable means for controlling the operation of said clutch.

16. A hammer operating mechanism for asphalt cutters comprising a driving shaft, a hoisting drum mounted on said shaft, a clutch for connecting and disconnecting said drum and shaft, and means for coupling and uncoupling said clutch including a driven clutch cam operatively related to said clutch and movable lengthwise of said shaft, a driving clutch cam co-operating with said driven clutch cam and rotatable about said shaft, and means for circumferentially adjusting said driven clutch cam comprising a screw sleeve pivotally mounted on said driven clutch cam, a screw shaft having a thread working in said screw sleeve, a hanger having a bearing in which said screw shaft is journaled, an adjusting shaft on which said hanger is pivotally mounted, and a worm gearing operatively connecting said adjusting shaft and screw shaft.

ROGER J. SWEET.